(12) United States Patent
Fleischman

(10) Patent No.: US 7,721,396 B2
(45) Date of Patent: May 25, 2010

(54) COUPLING APPARATUS WITH ACCESSORY ATTACHMENT

(75) Inventor: Curtis Fleischman, Clackamas, OR (US)

(73) Assignee: Stable Solutions LLC, Clackamas, OR (US)

( * ) Notice: Subject to any disclaimer, the term of this patent is extended or adjusted under 35 U.S.C. 154(b) by 592 days.

(21) Appl. No.: 11/621,549

(22) Filed: Jan. 9, 2007

(65) Prior Publication Data

US 2008/0164381 A1    Jul. 10, 2008

(51) Int. Cl.
*F16L 3/00* (2006.01)
*F16L 3/08* (2006.01)

(52) U.S. Cl. .................... 24/460; 24/303; 248/74.2; 248/206.5; 248/309.4

(58) Field of Classification Search ............... 248/74.1, 248/74.2, 74.4, 206.5, 309, 537; 24/460
See application file for complete search history.

(56) References Cited

U.S. PATENT DOCUMENTS

| | | | |
|---|---|---|---|
| D295,723 S | 5/1988 | Shioda | |
| 5,018,260 A | 5/1991 | Ziu | |
| 5,249,336 A * | 10/1993 | Miller | 24/303 |
| D344,449 S | 2/1994 | Ward | |
| 5,752,297 A * | 5/1998 | Ramey | 24/460 |
| 6,064,509 A | 5/2000 | Tonar et al. | |
| 6,148,484 A * | 11/2000 | Andreae, Jr. | 24/334 |
| D438,449 S | 3/2001 | Taylor | |
| D483,654 S | 12/2003 | Taylor | |
| 2005/0139732 A1* | 6/2005 | Kato | 248/71 |

FOREIGN PATENT DOCUMENTS

| | | |
|---|---|---|
| JP | 51156946 U | 12/1976 |
| JP | 10248410 A | 9/1998 |
| KR | 200142520 Y1 | 6/1999 |

* cited by examiner

*Primary Examiner*—Robert J Sandy
(74) *Attorney, Agent, or Firm*—Schwabe, Williamson & Wyatt, P.C.

(57) ABSTRACT

Embodiments of the present invention provide fastening devices adapted to couple to rigid members and which may further include attachment features for coupling items to the rigid member.

10 Claims, 4 Drawing Sheets

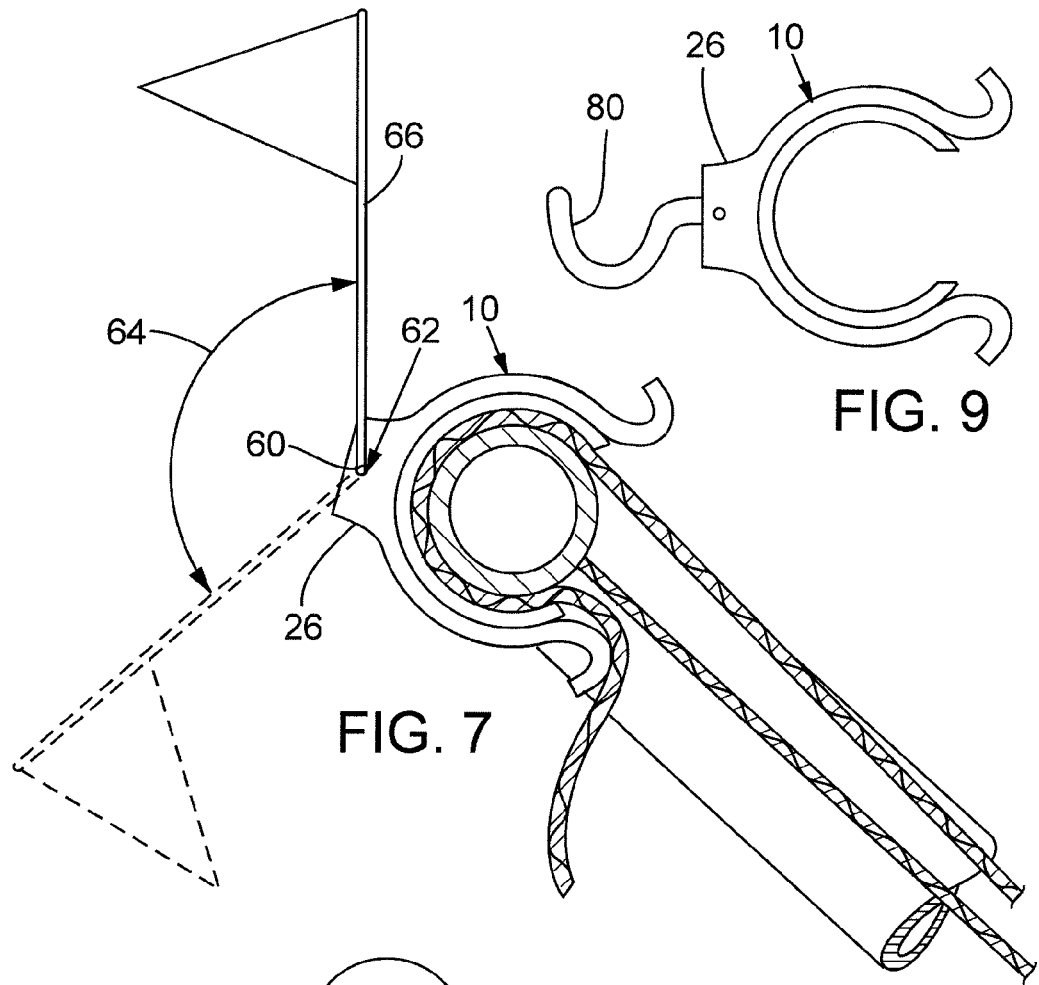
FIG. 9
FIG. 7
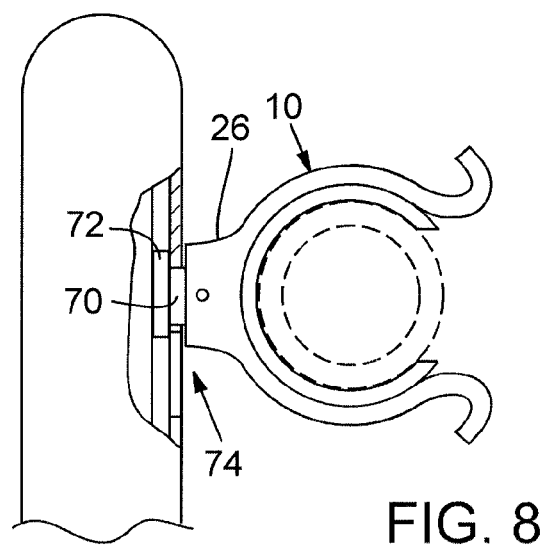
FIG. 8

COUPLING APPARATUS WITH ACCESSORY ATTACHMENT

TECHNICAL FIELD

Embodiments of the present invention relate to the field of coupling devices, and, more specifically, to the field of clips adapted to couple to a rigid member and, in some embodiments further adapted to couple an accessory or other item to the rigid member.

BACKGROUND

Lounge chairs, such as those found at beach resorts, swimming pools, and home patios, are often used simultaneously with towels. The towels are used for various reasons including, but not limited to, cushioning and comfort, as a barrier to hot plastic or metal heated by the sun, as a moisture absorber, or as a way of occupying a chair while away. These uses typically require the towel be placed over the chair in a draped fashion.

Towels, through body movement or natural occurrences, do not normally stay in their desired position. Breezes or body movements such as standing up, flipping from one side to another, sitting up, shifting weight, or leaning over to reach for another object are frequent, notorious causes of towel displacement. This displacement often requires the user to rearrange the towel back to its intended position. As reoccurrences become more frequent, the user may often become frustrated and annoyed.

Further, it is often the case where a person using a lounge chair or a public restroom has items with them that they would like to keep readily accessible, such as cell phones, but are not so equipped given the nature of their environment. Further, it is desirable to have a clip adapted to couple to a rigid member, such as a railing on a boat, and be further able to couple various items to the rail, again such as cell phones, fishing tackle, and the like.

BRIEF DESCRIPTION OF THE DRAWINGS

Embodiments of the present invention will be readily understood by the following detailed description in conjunction with the accompanying drawings. Embodiments of the invention are illustrated by way of example and not by way of limitation in the figures of the accompanying drawings.

FIG. 7 illustrates a profile view of a clip having an attachment member wherein the attachment member is a flag capable of rotation in accordance with various embodiments of the invention;

FIG. 8 illustrates a profile view of a clip having an attachment member wherein the attachment member is a cylindrical clip member being received in a substantially U-shaped seat in accordance with various embodiments of the invention;

FIG. 9 illustrates a profile view of a clip having an attachment member wherein the attachment member is a hook in accordance with various embodiments of the invention.

DETAILED DESCRIPTION OF EMBODIMENTS OF THE INVENTION

Figure 1:
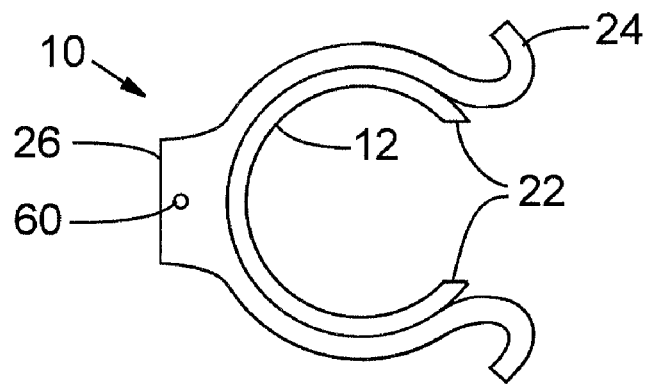
FIGS. 1-3 illustrate views of a clip in accordance with various embodiments of the present invention.

In the following detailed description, reference is made to the accompanying drawings which form a part hereof wherein like numerals designate like parts throughout, and in which is shown by way of illustration embodiments in which the invention may be practiced. It is to be understood that other embodiments may be utilized and structural or logical changes may be made without departing from the scope of the present invention. Therefore, the following detailed description is not to be taken in a limiting sense, and the scope of embodiments in accordance with the present invention is defined by the appended claims and their equivalents.

Various operations may be described as multiple discrete operations in turn, in a manner that may be helpful in understanding embodiments of the present invention; however, the order of description should not be construed to imply that these operations are order dependent.

The description may use perspective-based descriptions such as up/down, back/front, and top/bottom. Such descriptions are merely used to facilitate the discussion and are not intended to restrict the application of embodiments of the present invention.

For the purposes of the description, a phrase in the form "A/B" means A or B. For the purposes of the description, a phrase in the form "A and/or B" means "(A), (B), or (A and B)". For the purposes of the description, a phrase in the form "at least one of A, B, and C" means "(A), (B), (C), (A and B), (A and C), (B and C), or (A, B and C)". For the purposes of the description, a phrase in the form "(A)B" means "(B) or (AB)" that is, A is an optional element.

The description may use the phrases "in an embodiment," or "in embodiments," which may each refer to one or more of the same or different embodiments. Furthermore, the terms "comprising," "including," "having," and the like, as used with respect to embodiments of the present invention, are synonymous.

In various embodiments in accordance with the present invention, a clip may be adapted to couple to a rigid member, and be further adapted to secure, couple, affix (permanently or temporarily), and/or attach an item to the rigid member. In various embodiments, the clip may be adapted to secure a towel to a rigid member portion of a chair at various points to prevent the towel from becoming displaced. In various embodiments, the clip may be adapted to couple an accessory to the rigid member by way of a variety of attachment interfaces. The clip in accordance with various embodiments is not only simple to use, but is inexpensive to manufacture.

According to various embodiments of the invention, a clip inn accordance with embodiments may be used to secure a towel or other substantially non-rigid object to a rigid member, such as a frame of a resort lounge chair. In some embodiments, the clip may have an inner and an outer surface of which the inner surface of the C defines an aperture for receiving at least a first object. In various embodiments, the clip may include a finger engaging member having features adapted to facilitate the securement and release of at least one of the objects. In still other embodiments, the clip may include an attachment feature coupled to the clip and adapted to couple an accessory to the rigid member. In various embodiments, the attachment feature may be, but is not limited to, a flag, a magnet, a hook, a clip, or other attachment interface. Yet in various embodiments, the clip may be of a variety of geometrical configurations suitable for coupling to a variety of rigid members depending on the desired use.

Figure 2:
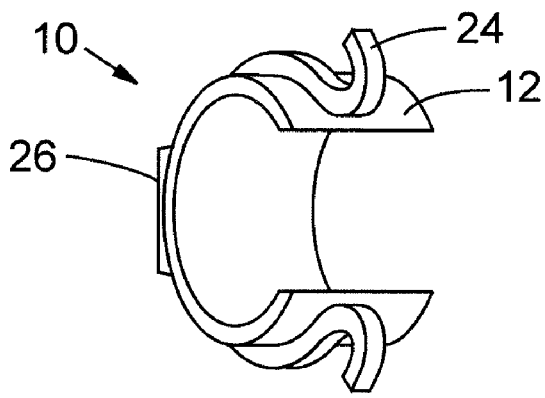
Figure 3:
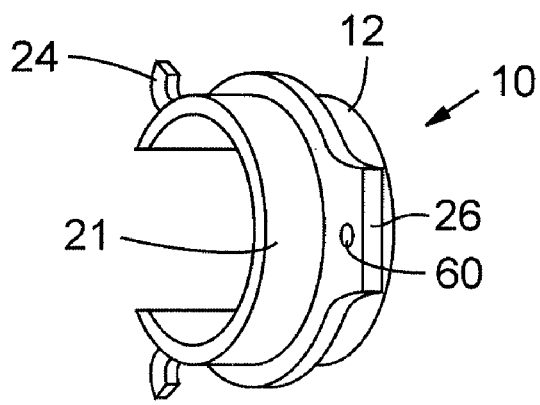

FIGS. 1 through 3 illustrate various views of an exemplary fastening apparatuses 10 in accordance with various embodiments. C-shaped clip 12 is depicted having an inner surface 20 and an outer surface 21. The inner surface 20 defines an aperture for receiving at least a rigid member (not shown). The clip 12 further comprises two ends 22 which, along with the C-shape, may be adapted to resiliently flex in order to engage and disengage the rigid member.

In various embodiments, the clip 12 may also include one or more finger engaging members 24. The finger engaging members 24 may vary in size and location on the clip. In one embodiment, the finger engaging member 24 may be coupled to and/or along an outer periphery of the clip 12 and be of constant dimension. In other embodiments, the finger engaging member 24 may be coupled along an outer periphery of the clip 12 but vary in width or height along the outer periphery of the clip 12. In various embodiments, the finger engaging member 24 may be a separate and distinct piece, or may be integrated within the clip 12. In various embodiments, the clip 12 and/or the finger engaging member 24 may also be coupled to and/or include an attachment member 26 (discussed further below); an example of which is illustrated in FIG. 3. The attachment member 26 may be coupled directly to the clip 12, or in other embodiments, it may be coupled to the finger engaging member 24.

Figure 5:
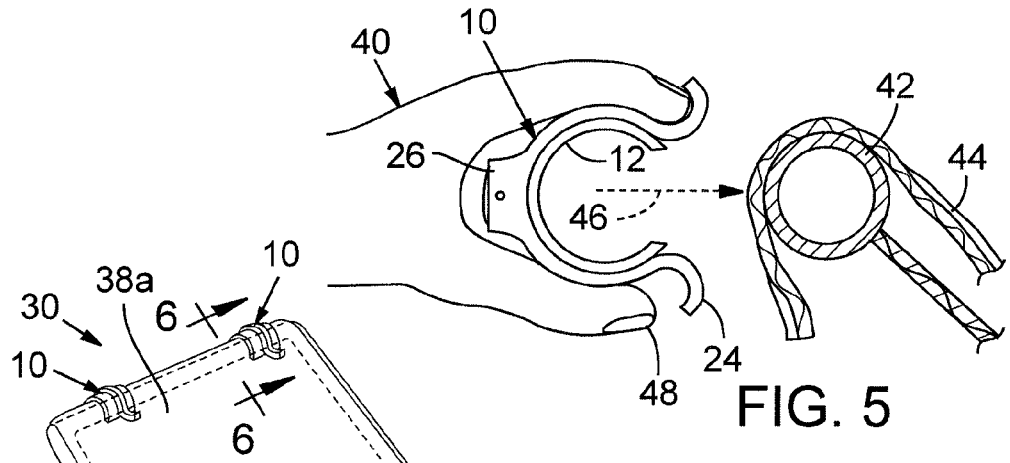
FIG. 5 illustrates a profile view of the application of a clip to a rigid object with a substantially non-rigid object draped there-around in accordance with various embodiments of the present invention.
Figure 4:
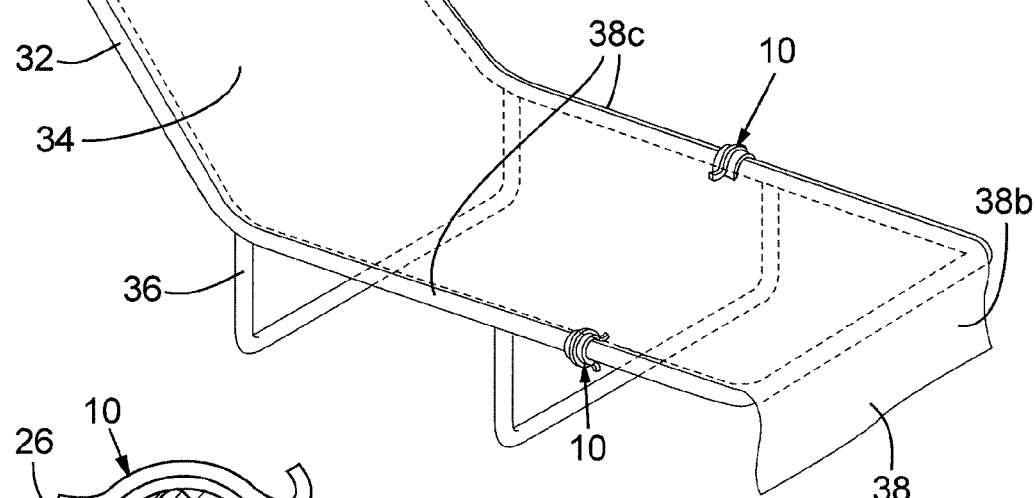
FIG. 4 illustrates a plurality of clips fastening a beach towel to a lounge chair at various points on the outer frame of the lounge chair in accordance with various embodiments of the present invention.
Figure 6:
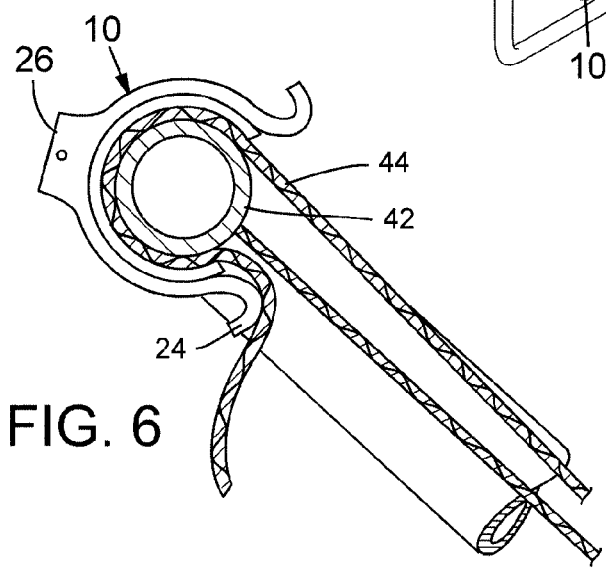
FIG. 6 illustrates a profile view of a clip as applied to a rigid object with a substantially non-rigid object draped there-around in accordance with various embodiments of the invention.

FIGS. 4-6 illustrate use of a clip in accordance with embodiments of the present invention being used on a conventional resort lounge chair 30 such as those found at swimming pools, beach resorts, and on home patios. The chair 30 generally has an outer frame 32 (e.g. a rigid member) which supports the inner material 34 on which the user sits. Often, the outer frame 32 is tubular in shape; however, the invention is not limited in this sense as other geometrical shapes are contemplated. The chair 30 may also have supporting members 36 to lift the chair off of the ground and support the user in a reclined or upright position.

As illustrated in FIG. 4, a towel 38 draped over the lounging chair 30. The towel having an upper portion 38a draped over the head rest portion of the chair, a lower portion 38b draped over the foot portion of the chair, and side portions 38c extending along and in some cases may be draped over the side of the length of the chair. As mentioned earlier, it is typical for users to place towels in this position to create cushioning and comfort, to act as a barrier to hot plastic or metal heated by the sun, or to act as an indication of occupancy while the user is away. A towel placed in this manner has a tendency to fall off the head rest portion due to body movement or natural occurrences thereby creating a nuisance for the user.

In various embodiments, the apparatus 10 may engage the upper portion of a towel 38a and the outer frame 32, over which it is draped, to selectively secure the towel to the lounging chair. In various embodiments, multiple fastening apparatuses 10 can be placed at various locations around the outer frame 32 of the lounge chair so as to selectively secure the towel to the lounge chair.

An example of the engagement of the apparatus 10 to the outer frame 32 is best illustrated by referring to FIGS. 5 and 6. Referring first to FIG. 5, a users hand 40 can be seen applying the fastening apparatus 10 to a rigid member 42 having a substantially non-rigid object 44 wrapped therearound. As illustrated, the user's fingers 48 can be viewed engaging the finger engaging members 24. In various other embodiments, the user's hand 40 can apply pressure substantially across the outer periphery of the clip 12 (or apparatus 10). The user may apply pressure generally along horizontal line 46 causing the clip 12 (or apparatus 10) and the two ends 22 to resiliently flex as the objects 42 and 44 are engaged. Referring to FIG. 6, the fastening apparatus 10 can be seen in an engaged position with the rigid member 42 and the second substantially non-rigid object 44 wrapped around the first tubular object 42 selectively secured within the fastening apparatus 10. As can be seen, the fastening apparatus may apply a compressive force substantially across the inner surface 20 of the clip 12. In various embodiments, the clip may be sized to accommodate the size and/or geometry of the rigid member. In various further embodiments, the clip may be sized to further accommodate a non rigid member disposed there between (e.g. a beach towel).

In various embodiments, clip 12 and/or apparatus 10 may include one or more attachment features adapted to attach various items to a rigid member via the clip. FIGS. 7-9 illustrate various example embodiments capable of coupling to a variety of items through a variety of attachment interfaces. FIG. 7 illustrates an example embodiment wherein the fastening apparatus 10 has selectively attached a non rigid member to a rigid member. The fastening apparatus further includes an attachment feature or member 26. The attachment member 26 comprises an attachment interface such as an aperture 60 adapted to receive a male end 62 and allow rotation 64 of the male end. In various embodiments, the male end 62 may be coupled to the stem of a flag 66 in which the rotation 64 produces the effect of positioning the flag up or down. In various embodiments the attachment interface may be reversed between the securing item and the apparatus/clip.

FIG. 8 illustrates another example embodiment, including a fastening apparatus 10 having an attachment member 26. In the illustrated embodiment, the attachment member 26 is a clip having an attachment interface of a first cylindrical portion 70 of a first diameter, and a second cylindrical portion 72 of a larger diameter. The second cylindrical portion 72 is positioned on top of the first cylindrical portion 70 along the same axis so as to create a protruding member capable of being inserted into a substantially U-shaped seat 74.

FIG. 9 illustrates an example embodiment of a fastening apparatus having an attachment member 26, wherein, the attachment member may be in the form of a hook 80 to hang, for example, keys and/or other items. In various embodiments, a variety of other attachment members may be used having different attachment interfaces, including, but not limited to, magnets, spring biased clips, and/or interlocking hook and loop type fabrics.

In a preferred embodiment, the fastening apparatus comprises a clip having a diameter of approximately 1¼ inches to selectively secure and release the outer frame of a majority of resort lounge chairs. In another embodiment, the fastening apparatus comprises a clip having a diameter of approximately 1 inch to selectively secure and release a majority of tubular objects associated with marine applications such as, but not limited to, side railings and ropes. In various other embodiments, the size and geometrical shape of the fastening apparatus may be varied depending on the size and geometrical shape of the rigid member to which the clip is to couple.

Figure 10:
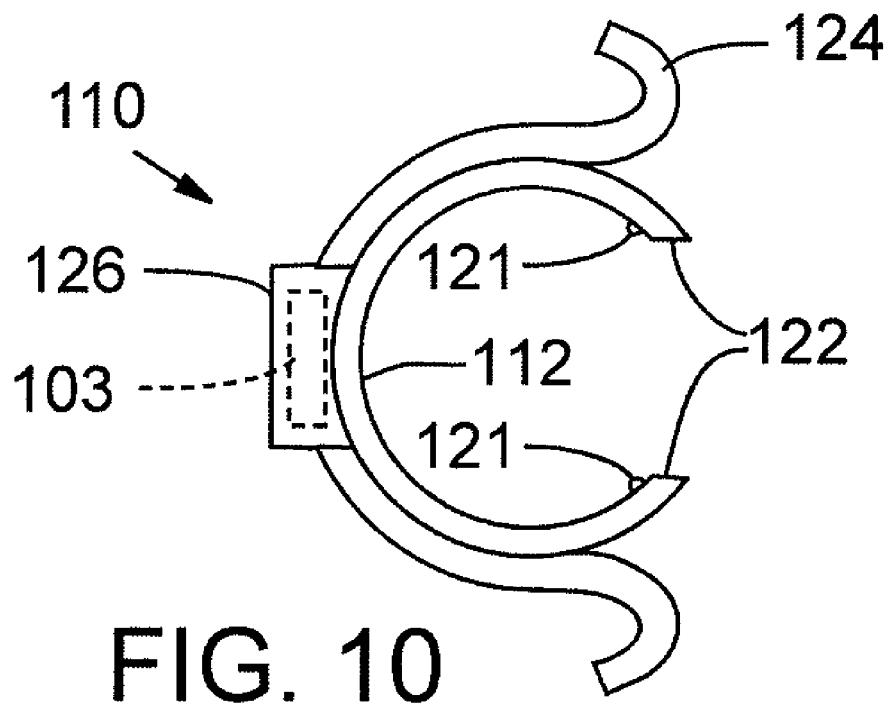
FIGS. 10-11 illustrate views of a clip in accordance with various embodiments of the present invention.
Figure 11:
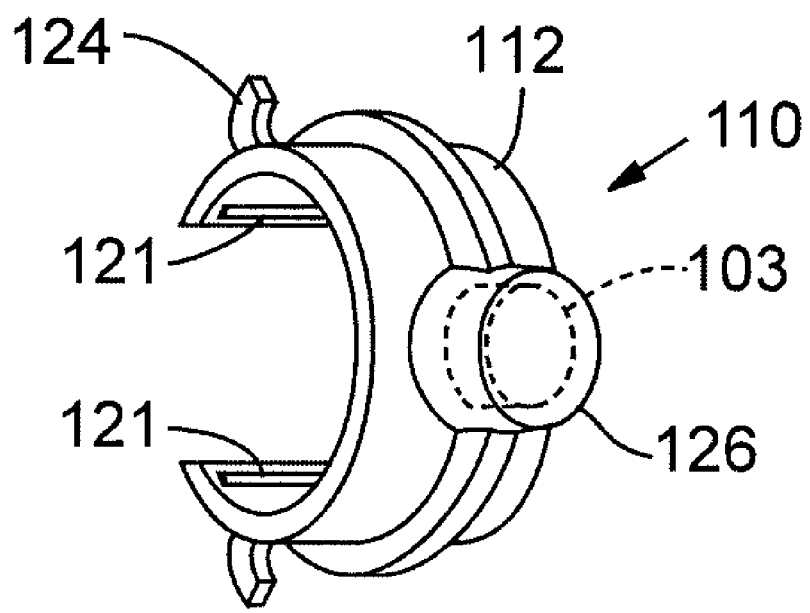

FIGS. 10-11 illustrate an example embodiment of a fastening apparatus in accordance with various embodiments of the present invention. Attachment member 126 may have a magnet disposed therein such that metallic items may be secured to the clip 110 via magnet 103.

In various embodiments, as also illustrated and FIGS. 10-11, a raised member 121 may be positioned on the inner surface 120 near the edges 122. Raised member 121 may provide an increased resistance to removal of the clip. The protrusion of the raised member may vary in height, width, size and shape in order to provide the amount of increased resistance that is desired.

In various embodiments, the clips may act as removable securing and attaching devices, which may be coupled to other surfaces, such as the panels of bathroom stalls, shower doors and the like. So positioned, items (e.g. a coat, keys, toiletries, etc) may be hung from the finger engaging members 24/124. Further, items may be coupled to the attachment member 26/126.

Although certain embodiments have been illustrated and described herein for purposes of description of the preferred embodiment, it will be appreciated by those of ordinary skill in the art that a wide variety of alternate and/or equivalent embodiments or implementations calculated to achieve the same purposes may be substituted for the embodiments shown and described without departing from the scope of the present invention. Those with skill in the art will readily appreciate that embodiments in accordance with the present invention may be implemented in a very wide variety of ways. This application is intended to cover any adaptations or variations of the embodiments discussed herein. Therefore, it is manifestly intended that embodiments in accordance with the present invention be limited only by the claims and the equivalents thereof.

What is claimed is:

1. A fastening apparatus comprising:

a clip having an inner and an outer surface, the inner surface defining an aperture for receiving a rigid member, wherein the clip is adapted to provide an inward force into the aperture to selectively secure the rigid member inside the aperture;

a finger-engaging member coupled to the outer surface of the clip, the finger-engaging member adapted to facilitate the attachment and release of at least the rigid member; and an attachment member coupled to the outer surface of the clip, wherein the attachment member is a magnet.

2. The fastening apparatus of claim 1, further comprising:

the clip having two ends defining a gap;

the gap having an arc between 15 and 60 degrees measured from a vertex at the center of the clip;

the ends and the clip adapted to resiliently flex to engage and disengage the rigid member.

3. The fastening apparatus of claim 2, wherein the aperture is adapted to engage a substantially non-rigid member wrapped about the rigid member.

4. The fastening apparatus of claim 3, wherein the inward force is manifested as a compressive force between the inner surface and the non rigid member.

5. The fastening apparatus of claim 1, wherein the finger-engaging member is coupled to the outer surface of the clip along an outer periphery of the clip.

6. The fastening apparatus of claim 1, further comprising one or more raised members positioned on the inner surface.

7. A fastening apparatus comprising:

a clip having an inner and an outer surface, the inner surface defining an aperture for receiving a rigid member; the clip adapted to engage the rigid member and provide an inward force into the aperture to selectively secure the rigid member inside the aperture; and an attachment member coupled to the outer surface of the clip, wherein the attachment member is a magnet.

8. The fastening apparatus of claim 7, wherein the attachment member is a magnet.

9. The fastening apparatus of claim 7, further comprising a finger-engaging member coupled to the outer surface of the clip, the finger-engaging member adapted to facilitate engagement and release of at least the rigid member.

10. The fastening apparatus of claim 7, further comprising one or more raised members positioned on the inner surface.

\* \* \* \* \*